UNITED STATES PATENT OFFICE.

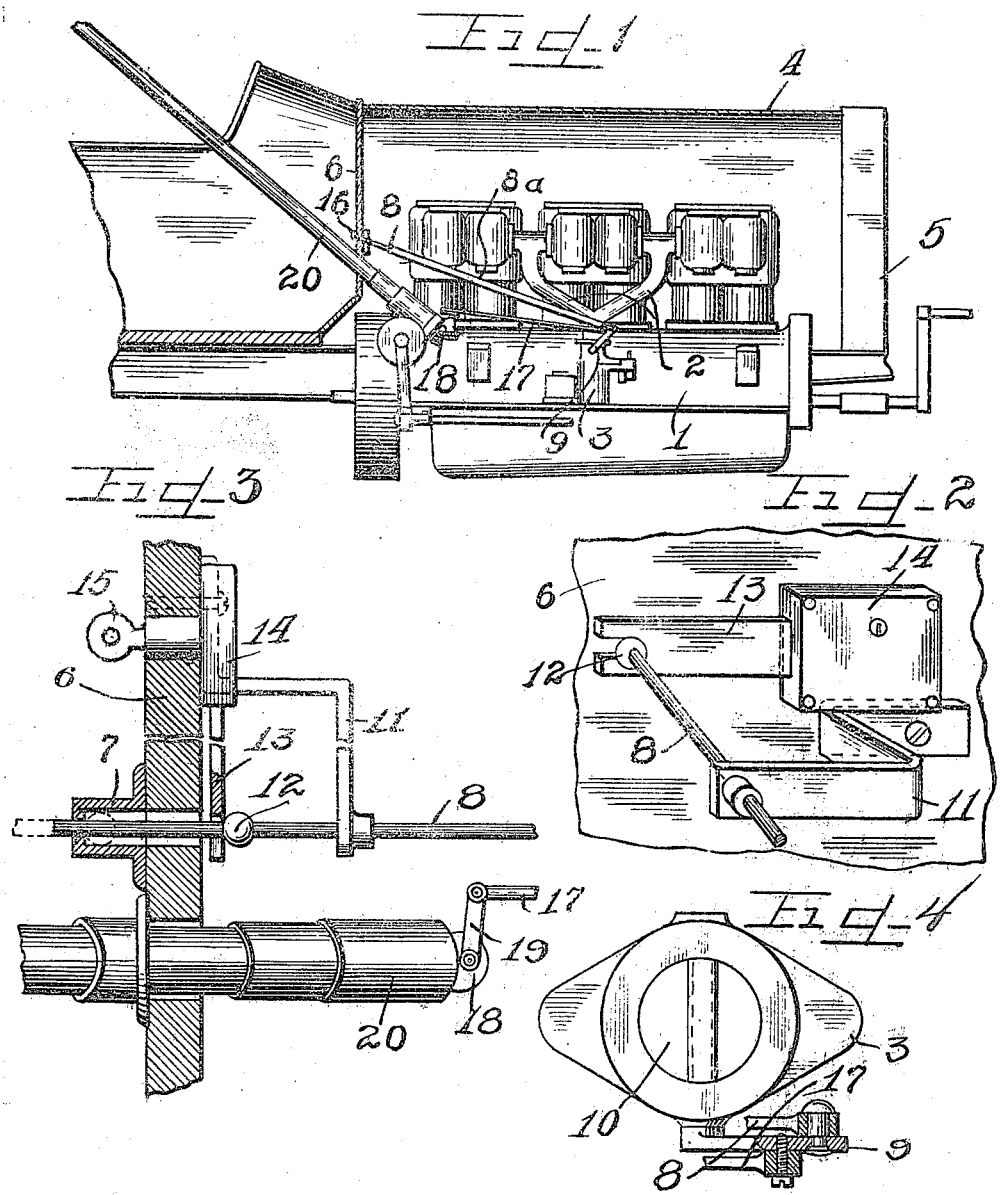

GEORGE ARCHER, OF CHICAGO, ILLINOIS.

DASH-CONTROLLED CARBURETER-VALVE LOCK.

1,167,467.   Specification of Letters Patent.   Patented Jan. 11, 1916.

Application filed January 17, 1914. Serial No. 812,722.

*To all whom it may concern:*

Be it known that I, GEORGE ARCHER, a citizen of the United States, and a resident of the city of Chicago, in the county of Cook and State of Illinois, have invented certain new and useful Improvements in Dash-Controlled Carbureter-Valve Locks, and I do hereby declare that the following is a full, clear, and exact description of the same, reference being had to the accompanying drawings, and to the numerals of reference marked thereon, which form a part of this specification.

The theft of motor cars has become so frequent in the past few years, as to cause some alarm among the users of such vehicles, and while numerous devices have been put upon the market to prevent such thefts, yet from the increasing number of thefts occurring each day, it can easily be surmised that none of such devices have been entirely successful in their operation. For instance, many motor cars are provided with lock controlled switches in order that the ignition system may only be switched on and off by one in possession of the proper key. Locks have also been provided in the fuel supply line, but owing to the inconvenient arrangement of the supply line with respect to the operator's position in the car, valves provided with locks in the supply line are seldom used.

This invention relates to locking means for a valve in the fuel supply line leading to the engine, and in particular the locking means for the throttle valve of the carbureter, whereby the valve may be locked by means mounted on the dash of the motor car, and convenient of access.

It is an object of this invention to provide an actuating rod connected to the throttle valve of a carbureter and slidably mounted for operation in the dash of a motor car, and with locking means mounted in the dash to lock said actuating rod in a position to maintain the throttle valve closed.

It is also an object of this invention to provide a slidably mounted actuating rod controlling the throttle valve of a carbureter, convenient for access at the dash of a motor car, and with a locking lever actuatable by a key insertible in a lock on the dash to throw said lever into locking position preventing actuation of said rod and maintaining the throttle valve closed.

It is also an object of this invention to provide dash controlled locking means of simple construction for the throttle valve of a carbureter.

It is furthermore an object of this invention to provide an actuating rod for the throttle valve of a carbureter, said rod connected to the carbureter and slidably mounted in the dash of a motor car, and a lock mounted on said dash and provided with an extended locking lever slotted to engage said actuating rod to limit the same in its movement.

It is finally an object of this invention to provide a cheap, simple and durable device of the class described, acting to effectively lock the fuel supply line from unauthorized manipulation.

The invention (in a preferred form) is hereinafter described, and more fully pointed out and defined in the appended claims.

In the drawings: Figure 1 is a fragmentary view, partly broken away, of the front end of a motor car, illustrating a device embodying my invention connected to the carbureter. Fig. 2 is a perspective view of a part of the mechanism mounted on the back or rear surface of the dash. Fig. 3 is a horizontal section taken through the dash, illustrating the relation of the members, and with certain parts shown in elevation. Fig. 4 is a top plan view of a portion of the carbureter, showing the attachment of the actuating rod to the throttle valve thereof.

As shown in the drawings: The reference numeral 1, indicates as a whole a six cylinder gasolene internal combustion motor provided with an intake manifold 2, and a carbureter 3, connected thereto. The motor is mounted, as usual, upon the chassis frame of the vehicle, and is covered by a bonnet, 4. The bonnet 4, extends from the radiator 5, to the dash 6, and secured upon the outer or front surface of the dash, is an apertured thimble member 7. An actuating rod 8, is connected at one of its ends to a throttle lever 9, controlling the butterfly valve 10, of the carbureter 3, and said rod 8, extends through an aperture in the dash and in and through said thimble member 7. A pipe member 8ª, is slipped over the rod 8, prior to its attachment to the other parts of the device, the pipe member serving to reinforce and protect the rod within.

A bracket 11, is secured upon the rear surface of the dash, and is apertured to receive said actuating rod 8, therethrough, to assist in maintaining the same in proper alinement with the thimble portion 7. Said rod 8, is provided with a stop 12, shown as spherical in shape, and a relatively long slotted locking lever 13, forming a part of a lock 14, also secured upon the rear surface of the dash, is adapted to slidably engage said rod 8, and prevent movement of the stop 12, therepast, thus locking said actuating rod from movement in a certain direction. A key 15, is provided for said lock 14, and is insertible therein from the front side of the dash, and inasmuch as the particular construction of the lock itself forms no part of my invention, the particular details thereof are immaterial. As shown in Fig. 1, the extremity of said actuating rod 8, projecting through the dash, is provided with any suitable type of finger grip 16. Of course, the usual actuating rod 17, is also connected to the carbureter throttle lever 9, and by means of bevel gears 18, one of which is connected by means of a crank 19, to said rod 17. The throttle may be controlled in the customary manner by a lever mounted on a steering wheel, (not shown) and connected within the steering post 20, to one of said bevel gears. Of course, when said locking lever 13, is retracted, the carbureter may be manipulated as usual from the steering wheel, and the actuating rod 8, will merely move back and forth with movement of the throttle lever.

The operation is as follows: When it is desired to lock the car from theft, the actuating rod 8, is pushed forwardly by the operator, thus moving the throttle valve lever and closing the butterfly valve 10. The key 15, is then turned in the lock 14, thus projecting the locking lever 13, into the position shown in Figs. 2 and 3, and the stop 12, on said rod 8, then prevents retraction of the rod or, in fact, any opening movement of the lever 9. In this construction, I have assumed that the butterfly valve 10, may entirely close the fuel supply line to prevent any flow of gas therethrough.

I am aware that various details of construction may be varied through a wide range without departing from the principles of this invention. I therefore do not purpose limiting the patent otherwise than necessitated by the prior art.

I claim as my invention:

1. The combination with the throttle valve of a carbureter and means for actuating the same at the steering post of an automobile, of an auxiliary actuating rod connected to the carbureter and slidably mounted in the dash of the motor car, and locking means adapted to lock said actuating rod to prevent opening of the carbureter throttle valve.

2. In a device of the class described the combination with a lock adapted to lock the throttle valve of a carbureter from opening, of actuating means connected to the throttle valve of the carbureter capable of engagement by said lock to permit locking of the carbureter from the dash of a motor car, and mechanism for normally operating the throttle valve of the carbureter when said means is released from said lock.

3. In a device of the class described the combination with a lock, a carbureter, a throttle valve in said carbureter, an auxiliary actuating rod connected to said throttle valve, an extended slotted locking lever in said lock adapted to engage around said actuating rod, a stop thereon to prevent movement of said actuating rod when engaged by said locking lever, and a key for extending and retracting said locking lever from the lock.

4. In a device of the class described the combination with the throttle valve of a carbureter, a lock, an auxiliary actuating rod connected to the throttle valve and adapted to be operatively engaged by said lock to prevent movement thereof to lock the carbureter in closed position, and actuating means connected to operate said throttle valve when the auxiliary rod is not engaged by said lock.

5. In a device of the class described the combination with the main actuating means of the throttle valve of a carbureter, of auxiliary mechanism for actuating said throttle valve permitting said throttle valve to be operated by either one of said actuating members, and a lock connected to lock said auxiliary actuating means whereby the throttle valve of the carbureter is locked from movement by either one of said actuating members.

6. The combination with the throttle valve of a carbureter and means for actuating the same at the steering post of an automobile, of an auxiliary actuating rod connected to said throttle valve, and locking means adapted to lock said actuating rod to prevent opening of the carbureter throttle valve.

In testimony whereof I have hereunto subscribed my name in the presence of two subscribing witnesses.

GEORGE ARCHER.

Witnesses:
CHARLES W. HILLS, Jr.,
FRANK K. HUDSON.